United States Patent [19]

Nakamura

[11] Patent Number: 4,955,702
[45] Date of Patent: Sep. 11, 1990

[54] FIXED FOCUS BINOCULAR WITH VISUAL ACUITY COMPENSATING MECHANISM

[76] Inventor: Masakazu Nakamura, 6-5, Maeno-cho, 6-chome, Itabashi-ku, Tokyo, Japan

[21] Appl. No.: 286,503
[22] Filed: Dec. 19, 1988
[51] Int. Cl.⁵ .................. G02B 7/06; G02B 25/00; G02B 23/18
[52] U.S. Cl. ............................ 350/556; 350/552; 350/410; 350/579; 350/255
[58] Field of Search ............ 350/552, 554, 555, 556, 350/548, 550, 563, 564, 577, 410, 579, 255

[56] References Cited

U.S. PATENT DOCUMENTS

| | | | |
|---|---|---|---|
| 802,817 | 10/1905 | Lloyd | 350/552 |
| 1,482,881 | 2/1924 | Berggren | 350/556 |
| 4,848,887 | 7/1989 | Addy et al. | 350/545 |

FOREIGN PATENT DOCUMENTS

| | | | |
|---|---|---|---|
| 2363 | of 1903 | United Kingdom | 350/556 |
| 170929 | 10/1921 | United Kingdom | 350/555 |

Primary Examiner—Jon W. Henry
Attorney, Agent, or Firm—McGlew & Tuttle

[57] ABSTRACT

A pair of binoculars including a mechanism for adjusting the optical distance between objective lenses and ocular lenses so as to set the focus to the user's visual acuity. The visual acuity compensating mechanism is incorporated into the ocular lens side or the objective lens side. The pair of binoculars may be corrected to the focus meeting the user's visual acuity when the user begins use of the binocular.

3 Claims, 4 Drawing Sheets

FIXED FOCUS BINOCULAR WITH VISUAL ACUITY COMPENSATING MECHANISM

FIELD OF THE INVENTION

The present invention relates to the binocular with fixed focus, which eliminates the need for setting the focus every time the binocular is used.

DESCRIPTION OF THE PRIOR ARTS

When looking at an object through a pair of binoculars, a user needs to focus it to object while adjusting either an ocular lens or an objective lens.

Therefore, there is an inconvenience to the user focus the binocular on each occasion when you desire to take an immediate look at an object or when looking at a moving object substance due to the need to focus.

Consequently, a pair binoculars solving this kind of focusing inconvenience "fixed focus binocular has been proposed". Such binoculars having focus depth which has been preset deeply for eliminating the need for focusing the pair of binoculars on each of occasions.

However, this fixed focus pair of binoculars involves a problem that an image cannot be seen clearly in the case that, for example, its visual acuity has been adjusted to the person whose visual acuity is 1.0 on right and left eyes, in the case of the person who has an inferior visual acuity or a superior visual acuity than the abovementioned, or in the case of the person who has different visual acuities on right and left eyes. Namely, because there exists the difference among individuals in visual acuity, there is such an inconvenience to the person who is not meeting the visual acuity preset in the said fixed focus binocular that the binocular are inconvenient to him or he cannot utilize the binoculars.

BRIEF SUMMARY OF THE INVENTION

Since the focus of binoculars can be determined by the optical distance between objective lens and ocular lens, the binoculars shall be structured in a way that the optical distance between objective lens and ocular lens can be adjusted by manually sliding either of these lens barrels. As this sliding means, the method of making a pin protruded from the ocular lens barrel not only to engage the said pin into the guide groove of fixed straight line shape but also to engage it to a rotary spiral groove thereby of manually turning the said spiral groove to slide the ocular lens barrel, and also the method of setting the focus by sliding the ocular lens barrel by means of screws are conceivable.

OBJECT OF THE INVENTION

It is an object of this invention to provide such a type of fixed focus binoculars of which focus can be previously adjusted to the individual user's visual acuity before the binoculars are used.

DETAILED DESCRIPTION

Figure 1:
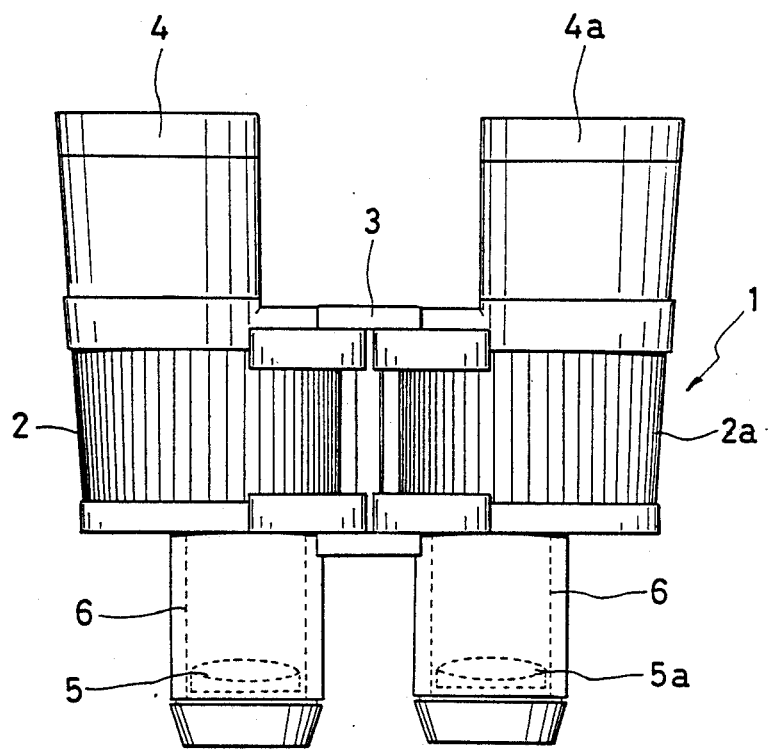
FIG. 1 is a plane view of the fixed focus binocular which incorporates into ocular lens external barrel the visual acuity compensating mechanism which is the feature of this invention.
Figure 2:
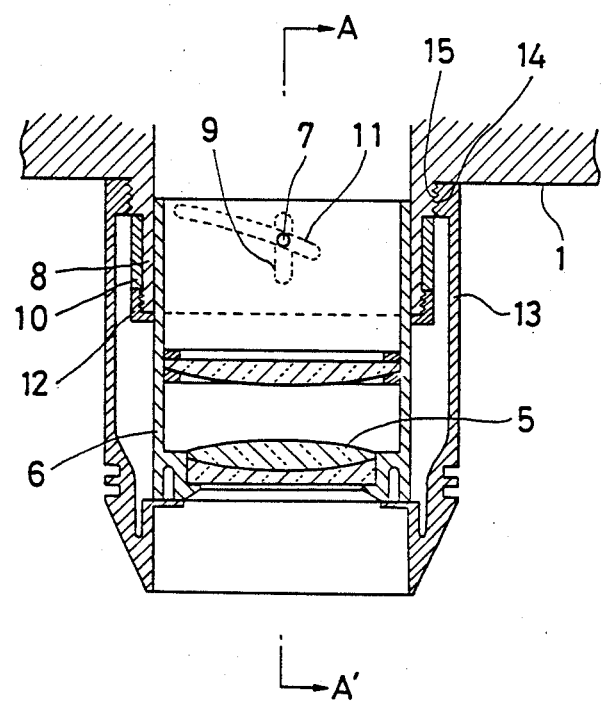
FIG. 2 is a cross-section diagram showing the condition where the visual acuity compensating mechanism has been built into the objective lens side.
Figure 3:
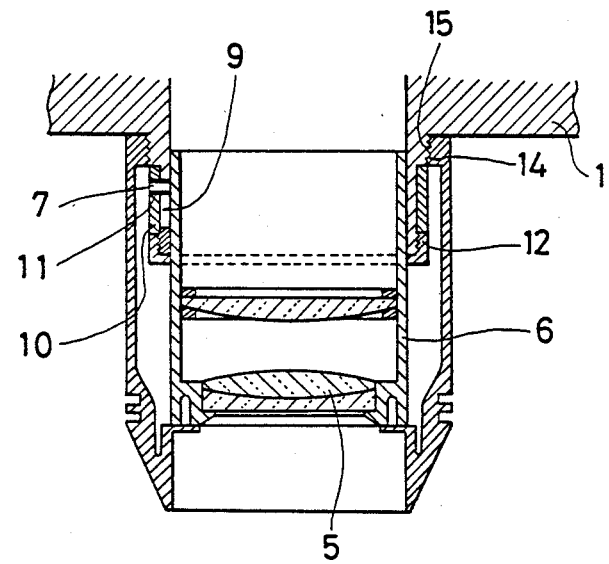
FIG. 3 is a cross sectional diagram taken along the line A—A'.

FIG. 1 shows a fixed focus binocular. Numeral 1 represents a pair of binoculars main body, this main body 1 couples the right and left barrels 2 and 2a to each other and can also adjust the width of eyes by opening or closing the right and left barrels 2 and 2a with the central shaft 3 as its center. Numerals 4 and 4a stand for objective lenses while 5 and 5a are ocular lenses. FIG. 2 indicates the cross section on the side of ocular lens 5. (However, the ocular lens 5a side has an identical construction to that of 5 side, so its explanation is omitted here).

The ocular lens 5 has been fixed to the ocular barrel 6. A pin 7 protrudes from the ocular lens barrel, and the tip of this pin 7 engages with the spiral groove 11 provided on a rotary barrel 10 through the guide groove 9 of straight line shape on a guide barrel 8 which is fixed to the main body 1. The rotary barrel 10 which is externally fitted to the guide barrel 8 can be rotated freely. The ocular lens barrel 6 can be slided freely inside the guide barrel 8. Numeral 12 is a rotary barrel retainer, 13 is a ocular lens external barrel which has been coupled to the screw 15 on the main body side by use of a screw 14, and this ocular lens external barrel incorporates the said occular lense barrel 6, guide barrel 8, rotary barrel 10 and rotary barrel retainer 12.

Figure 4:
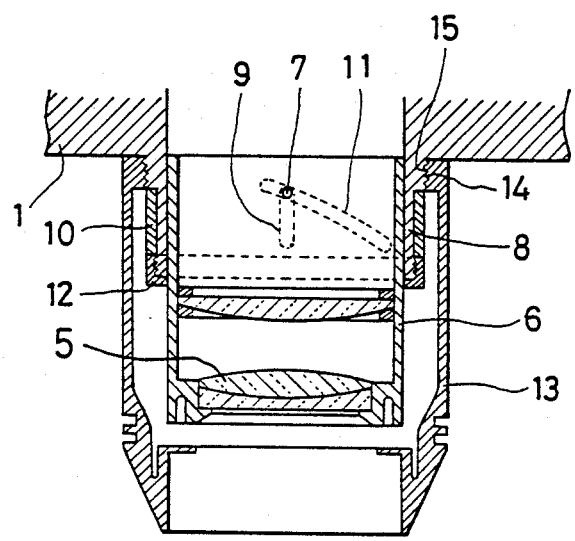
FIG. 4 is a cross sectional diagram of ocular lens portion under the condition where the ocular lens has been compensated by utilizing the visual acuity compensating mechanism.
Figure 5:
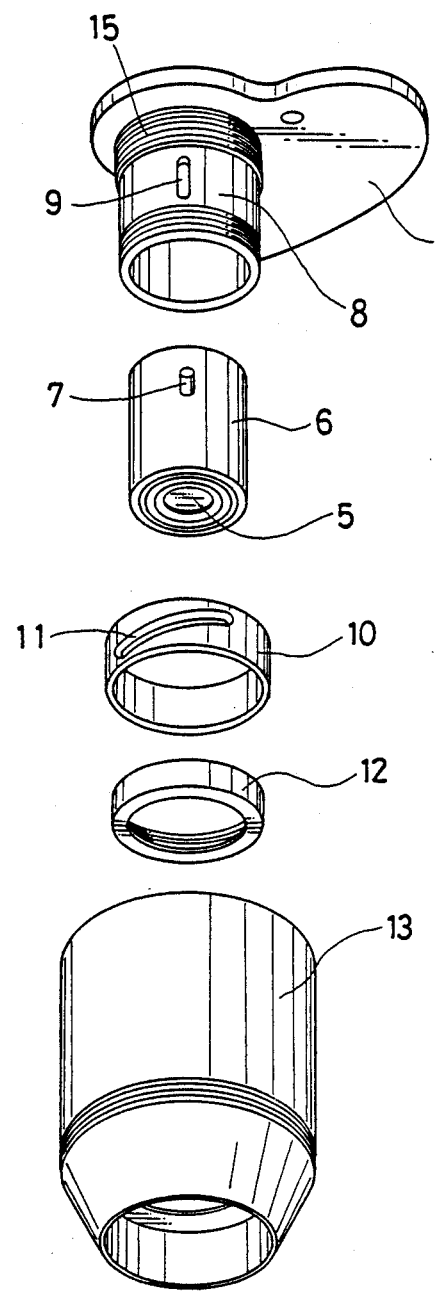
FIG. 5 is a exploded view in the state where the ocular lens barrel, guide barrel, rotary barrel and ocular lens external barrel have been disassembled for showing the visual acuity compensating mechanism.

In compensating the focus in the said visual acuity compensating mechanism, remove the screws 14 and 15 of ocular lens external barrel 13 to make the visual acuity compensating mechanism exposed. And, the user shall bring his eyes closer to the ocular lenses and turn the rotary barrel 10 while looking at an image. When the rotary barrel 10 is turned, the spiral groove 11 is displaced and the ocular lens barrel 6 slides along the guide groove 9 by the action of its pin 7. This situation is shown in FIG..2 and FIG. 4, and in FIG. 2 the ocular lens barrel 6 (ocular lens 5) is positioned at the standard place (visual acuity being 1.0) while in FIG. 4 the ocular lens barrel 6 (ocular lens 5) is positioned at the visual acuity of 1.5, namely is positioned at the place where the optical distance against the objective lens 4 is shorter than the standard. This ocular lens barrel 6 has been adjusted by slightly turning the rotary barrel 10 leftward (counterclockwise). Therefore, if the visual acuity is at 1.5, the rotary barrel 10 shall be turned in the right direction (clockwise) to adjust the position of ocular lens barrel 6 (ocular lens 5) in a way that the optical distance against the objective lens 5 may be elongated.

When the user begins to use the binoculars the said ocular lens 5 shall be adjusted by removing the ocular lens external barrel, and when the adjustment is over, the ocular lens external barrel 13 shall be fitted to the main body 1 utilizing the screws 14 and 15 for preventing the user's hand from touching the interior.

As clear from the explanation described above, the problem of individual persons' difference in visual acuity shall be solved by compensating for the optical distance between objective lens 4 and ocular lens 5 in line with his visual acuity. Moreover, as another means for achieving the identical object, it is possible to achieve it by adjusting the objective lens side instead of the ocular lens side. The concrete structure in this case may be identical to the case of said ocular lens 5.

Next, though the said embodiment utilized the action of spiral groove 11, it is also acceptable to adjust the optical distance against the objective lens 4 by means of the screwing-in system by providing threads on the ocular lens barrel 6. However, this arrangement is less desirable because there may be an error to the light beam when the ocular lens is turned.

The present invention can make it possible to use a fixed focus binocular in line or adjusted to a user's visual acuity as described above by adjusting the optical distance between objective lens and ocular lens.

For this reason, the user can clearly look at the objective substance. Moreover, even an object at the a small distance can also be seen clearly if the optical distance between objective lens and ocular lens can be adjusted to a wide range.

In addition, since the compensating mechanism has been incorporated inside the ocular lens external barrel, there is no fear for the compensated point to get out of order because of the touch of your hand with the said mechanism later.

I claim:

1. A binocular for viewing both near and distant objects at a constant focus presettable for the visual acuity of the view comprising: visual acuity compensating means for presetting the binocular focus to the visual acuity of a user prior to normal viewing including manually operated focussing means for changing the spacing between an ocular lens and an objective lens of the binocular and means for preventing access to said focussing means during normal viewing thereby to maintain the focus constant.

2. A pair of binoculars for viewing both near and distant objects at a constant focus presettable for the visual acuity of the viewer, comprising: first and second barrels; first and second objective lenses positioned within said first and second barrels respectively; means for coupling the first and second barrels; first ocular lens barrel including a first ocular lens arrangement; second ocular lens barrel including a second ocular lens arrangement; first ocular lens adjusting means for connecting said first ocular lens barrel to said first barrel and for adjusting the spacing between said first ocular lens arrangement and said first objective lens; second ocular lens adjusting means for connecting said second ocular lens barrel to said second barrel and for adjusting the spacing between said second ocular lens arrangement and said second objective lens; whereby operation of the adjusting means enables the focus of the binoculars to the preset for the visual acuity of the viewer prior to normal viewing; first and second manipulation prevention means, positioned about said first and said second ocular lens barrels, respectively, for preventing access to said first and said second ocular lens barrels respectively and the first and second adjusting means respectively, during normal viewing thereby to maintain the focus constant.

3. A binocular arrangement for viewing both near and distant objects at a constant focus presettable for the visual acuity of the viewer comprising: a main barrel; an objective lens positioned within said main barrel; a guide barrel positioned at an end of said main barrel said guide barrel being spaced a distance from said objective lens, said guide barrel having an axial slot extending in an axial direction; an ocular lens barrel supporting an ocular lens arrangement, said ocular lens barrel having a pin extending in a radial direction, said ocular lens barrel being positioned within said guide barrel, said pin extending through said axial slot, said ocular lens barrel being movable a distance between a first and second position, said distance being equal to the length of said axial slot; a rotary barrel, rotatably positioned about said guide barrel and fixed in an axial direction, said rotary barrel having a spiral groove engaging said pin, rotation of said rotary barrel causing said ocular lens barrel to move in an axial direction with respect to said guide barrel enabling the binocular focus to be preset for the visual acuity of the view; and, an external barrel positionable about each of said rotary barrel, guide barrel and ocular lens barrel for preventing access to said rotary barrel by the viewer to prevent movement of said ocular lens barrel in an axial direction during normal viewing thereby to main the focus constant.

* * * * *